United States Patent
Suzuki et al.

(10) Patent No.: US 10,478,931 B2
(45) Date of Patent: Nov. 19, 2019

(54) WORKPIECE ATTACHMENT/REMOVAL DEVICE

(71) Applicant: DMG Mori Co., LTD., Nara (JP)

(72) Inventors: Syoji Suzuki, Nara (JP); Yoshinobu Okuyama, Nara (JP); Hiroshi Yasuda, Nara (JP)

(73) Assignee: DMG MORI CO., LTD., Nara (JP)

( * ) Notice: Subject to any disclaimer, the term of this patent is extended or adjusted under 35 U.S.C. 154(b) by 219 days.

(21) Appl. No.: 15/559,770

(22) PCT Filed: Feb. 24, 2016

(86) PCT No.: PCT/JP2016/055409
§ 371 (c)(1),
(2) Date: Sep. 19, 2017

(87) PCT Pub. No.: WO2016/167029
PCT Pub. Date: Oct. 20, 2016

(65) Prior Publication Data
US 2018/0065222 A1   Mar. 8, 2018

(30) Foreign Application Priority Data
Apr. 13, 2015   (JP) ................. 2015-082080

(51) Int. Cl.
*B23Q 7/04* (2006.01)
*B23Q 7/16* (2006.01)

(52) U.S. Cl.
CPC ............... *B23Q 7/04* (2013.01); *B23Q 7/16* (2013.01)

(58) Field of Classification Search
CPC . B23Q 41/02; B23Q 1/70; B23Q 1/48; B23Q 1/4857; B23Q 1/4876; B23Q 7/04;
(Continued)

(56) References Cited

U.S. PATENT DOCUMENTS 3,033,059 A * 5/1962 James ................. B25J 5/02
414/627
4,279,560 A * 7/1981 Ito ..................... B23Q 7/04
212/333
(Continued)

FOREIGN PATENT DOCUMENTS

DE   29815125 U1   12/1998
DE   19756278 A1   7/1999
(Continued)

*Primary Examiner* — Glenn F Myers
(74) *Attorney, Agent, or Firm* — Miller, Matthias & Hull LLP

(57) ABSTRACT

A workpiece attachment/removal device includes a guide mechanism disposed along an X-axis before a table, first and second placement tables disposed at right and left sides of the table behind the guide mechanism, and a transfer mechanism moving along the X-axis while being guided by the guide mechanism. The transfer mechanism includes a base engaged with the guide mechanism and moving along the X-axis, a linear drive part moving the base along the X-axis, a pair of clamping arms having tip ends positioned at the table side, a clamping drive part opening and closing the clamping arms, and a turning drive part turning the clamping arms to move the tip ends of the clamping arms between a lower position and an upper position.

8 Claims, 10 Drawing Sheets

(58) Field of Classification Search
CPC .. B23Q 7/16; B23Q 7/1554; B23Q 7/155404; B23Q 7/155411; B23Q 7/1426; B23Q 7/1436; B23Q 7/1494; B23Q 7/046; B23Q 39/048; B25J 11/00; B25J 5/02; B25J 15/0028; B25J 15/0253; B65G 47/902
See application file for complete search history.

(56) References Cited

U.S. PATENT DOCUMENTS

| | | | | |
|---|---|---|---|---|
| 4,531,884 | A * | 7/1985 | Russell | B25J 5/02 |
| | | | | 192/48.9 |
| 6,557,235 | B1 * | 5/2003 | Katz | B23Q 1/012 |
| | | | | 29/563 |
| 7,150,706 | B2 | 12/2006 | Grob | |
| 8,851,820 | B2 * | 10/2014 | Bonora | H01L 21/6773 |
| | | | | 414/331.03 |
| 2006/0072988 | A1 * | 4/2006 | Hariki | B25J 5/02 |
| | | | | 414/282 |
| 2010/0092273 | A1 * | 4/2010 | Oda | B23Q 7/005 |
| | | | | 414/728 |

FOREIGN PATENT DOCUMENTS

| | | |
|---|---|---|
| JP | S62029203 | 2/1987 |
| JP | 02205436 A | 8/1990 |
| JP | H04014222 | 2/1992 |
| JP | H05051544 | 7/1993 |
| JP | H06039342 | 5/1994 |
| WO | 200200387 A2 | 1/2002 |

* cited by examiner (a)   (b)

(a)   (b)

(a)  (b)

(a)  (b)

(a)　　　　　　　　　　(b)

(a)　　　　　　　　　　(b)

WORKPIECE ATTACHMENT/REMOVAL DEVICE

TECHNICAL FIELD

The present invention relates to a workpiece attachment/removal device that unloads a workpiece placed on a table of a machine tool and loads a workpiece onto the table, more particularly, relates to a workpiece attachment/removal device preferably applicable to a machine tool having a table provided to be movable along a vertical Y-axis.

BACKGROUND ART

A known example of a machine tool having a table provided to be movable along a vertical Y-axis is a machine tool disclosed in Patent Literature 1 listed below. In this machine tool, a workpiece carriage and a mechanism (stand) supporting the workpiece carriage and vertically moving the workpiece carriage are disposed opposite to a machining unit including a spindle provided horizontally, with an appropriate space from the machining unit.

Further, in this machine tool, sliding rails are provided between the machining unit and the stand supporting the workpiece carriage, and roller conveyors are provided before and after the sliding rails in the longitudinal direction (conveying direction) of the sliding rails, the roller conveyor located upstream in the conveying direction loading a workpiece onto the sliding rails, and the roller conveyor located downstream in the conveying direction unloading a workpiece placed on the sliding rails.

More specifically, a workpiece is conveyed on the upstream roller conveyor and then loaded onto the sliding rails in a state of being attached to an attachment base called as "workpiece carrier", and the workpiece carrier is held by the workpiece carriage on the sliding rails. Thereafter, the workpiece is machined by the machining unit in a state of being held by the workpiece carriage. After the machining, the workpiece carrier is released from the workpiece carriage onto the sliding rails and then unloaded onto the downstream roller conveyor.

As described above, in the machine tool disclosed in Patent Literature 1, a workpiece is conveyed in a state of being attached on the workpiece carrier. Further, the workpiece is held by the workpiece carriage and machined while remaining held by the workpiece carrier.

CITATION LIST

Patent Literature

Patent Literature 1: U.S. Pat. No. 7,150,706

SUMMARY OF INVENTION

Technical Problem

By the way, in recent years, in the field of machine tools, due to the limitation of the space for installation of the machine tool, as well as for the purpose of shortening the whole machining time including the time for handling, such as conveying, etc., it is desired to make the whole machine including peripheral devices compact.

However, the above-described machine tool of Patent Literature 1 employs a manner configured to convey a workpiece in a state where the workpiece is attached to the workpiece carrier, in order to enable a manner configured to automatically convey a workpiece and cause the workpiece carriage to hold the workpiece; therefore, the overall size of the object to be handled is a workpiece plus the workpiece carriage. Accordingly, in comparison with a manner configured to convey only a workpiece, the roller conveyors and the workpiece carriage have to be large in size and the space between the stand and the machining unit also has to be large. Thereby, the overall size of the machine tool is excessively increased, which causes a problem that a large space is needed for installation of the machine tool.

Further, since the workpiece carriage is configured to hold the workpiece carrier by moving up and down, the range of motion of of the workpiece carriage needs a range equal to or larger than the stroke needed for machining; therefore, the height of the stand has to be increased in response thereto. Also in this respect, the overall size of the machine tool is excessively increased.

Further, when the workpiece carriage is larger, the inertia thereof is larger. Therefore, the moving speed for vertically moving the workpiece carriage cannot be increased, which causes a problem that machining time is made longer. Further, since the space between the workpiece carriage and the machining unit is made larger, the spindle of the machining unit needs to be moved more than necessary when machining, which also makes the machining time longer.

The present invention has been achieved in view of the above-described circumstances, and an object thereof is to provide a workpiece attachment/removal device which enables an overall size including a machine tool to be more compact than conventional ones and does not influence machining time in the machine tool.

Solution to Problem

The present invention, for solving the above-described problems, relates to a workpiece attachment/removal device attached to a machine tool, the machine tool including a bed, a saddle provided on the bed, a spindle head provided on the saddle, a spindle rotatably supported by the spindle head and holding a tool at a front end thereof, a pair of right and left columns erected on the bed before the saddle and spaced apart in an X-axis direction which is a lateral direction of the bed, and a table supported on front surfaces of the pair of columns to be movable along a vertical Y-axis, the workpiece attachment/removal device unloading a workpiece placed on the table and loading a workpiece onto the table, the workpiece attachment/removal device including:

a guide mechanism disposed along the X-axis before the table;

a first placement table and a second placement table disposed at right and left sides of the table behind the guide mechanism; and a transfer mechanism moving along the X-axis while being guided by the guide mechanism, the transfer mechanism including:
a base engaged with the guide mechanism and provided to be movable along the X-axis;
a linear drive part moving the base along the X-axis direction;
a pair of clamping arms provided to be openable and closable and disposed such that tip ends thereof are located at the table side;
a clamping drive part opening and closing the clamping arms; and a turning drive part supporting the clamping arms on the base and turning the clamping arms such that the tip ends thereof pivot between a lower position and an upper position, the clamping arms being configured to be moved along the X-axis direction by the linear drive part so as to pass above each of the table, the first placement table, and the second placement table, and the transfer mechanism being configured to execute an operation of clamping a workpiece placed on the table with the clamping arms and unloading the workpiece onto the second placement table, and an operation of clamping a workpiece placed on the first placement table with the clamping arms and loading the workpiece onto the table.

As described above, the workpiece attachment/removal device according to the present invention is attached to a horizontal type machine tool in which a spindle is provided horizontally and a table is provided to be movable along a vertical Y-axis; the workpiece attachment/removal device unloads a workpiece placed on the table and loads a workpiece onto the table through operation of the transfer mechanism.

More specifically, the transfer mechanism is driven by the linear drive part, thereby being moved along the X-axis on the guide mechanism and positioned in front of each of the first placement table, the table, and the second placement table. Further, the pair of clamping arms is driven by the clamping drive part, thereby being opened and closed to clamp and unclamp a workpiece, and is driven by the turning drive part, thereby being turned between the upper position and the lower position.

By combining these operations, the transfer mechanism executes an operation of clamping a workpiece placed on the table with the clamping arms and unloading the workpiece onto the second placement table and an operation of clamping a workpiece placed on the first placement table with the clamping arms and loading the workpiece onto the table. Note that specific manners of the operations will be described in detail later.

Thus, with this workpiece attachment/removal device, since the device is provided outside and adjacent to the machine tool, unlike the conventional art, providing the workpiece attachment/removal device does not require excessively increasing the size of the machine tool itself and a large space is not needed for installation thereof. Further, since the transfer mechanism according to the present invention is configured to directly clamp a workpiece for transfer, the size of the workpiece attachment/removal device itself can be made compact in comparison with the conventional art in which a workpiece is transferred in a state be being attached to a workpiece carrier. Also in this respect, unlike the conventional art, a large space is not needed.

Further, since the workpiece attachment/removal device is configured to be provided outside and adjacent to a machine tool, the machine tool can employ an optimum configuration without being influenced by the configuration of the workpiece attachment/removal device. Therefore, unlike the conventional art, the machine tool can machine a workpiece in an optimum time without being influenced by the workpiece attachment/removal device.

Note that, in the present invention, when the clamping arms are moved along the X-axis direction by the linear drive part, the tip ends of the clamping arms may be in a state of being positioned at an intermediate position between the lower position and the upper position.

Further, in the present invention, two said transfer mechanisms, i.e., a first transfer mechanism and a second transfer mechanism, may be provided.

In this case, the second transfer mechanism is configured to execute an operation of clamping a workpiece placed on the table with the clamping arms of the second transfer mechanism and unloading the workpiece onto the second placement table, and the first transfer mechanism is configured to execute an operation of clamping a workpiece placed on the first placement table with the clamping arms of the first transfer mechanism and loading the workpiece onto the table.

With this configuration, the workpiece unloading operation executed by the second transfer mechanism and the workpiece loading operation executed by the first transfer mechanism cab be performed concurrently, which can reduce the time required for unloading a workpiece and loading a workpiece.

Furthermore, the first and second placement tables may be each configured to be able to lift and lower a workpiece receiver for placing the workpiece thereon.

Advantageous Effects of Invention

As described above, with the workpiece attachment/removal device according to the present invention, since the device is provided outside and adjacent to a machine tool, unlike the conventional art, it is not necessary to excessively increase the size of the machine tool itself and a large space is not needed for installation thereof. Further, since the transfer mechanism of the workpiece attachment/removal device is configured to directly clamp a workpiece for transfer, the size of the workpiece attachment/removal device itself can be made compact in comparison with the conventional art in which a workpiece is transferred in a state of being attached to a workpiece carrier. Also in this respect, unlike the conventional art, a large space is not needed.

Further, since the machine tool can employ an optimum configuration without being influenced by the configuration of the workpiece attachment/removal device, unlike the conventional art, the machine tool can machine a workpiece in an optimum time without being influenced by the workpiece attachment/removal device.

DESCRIPTION OF EMBODIMENTS

Figure 1:
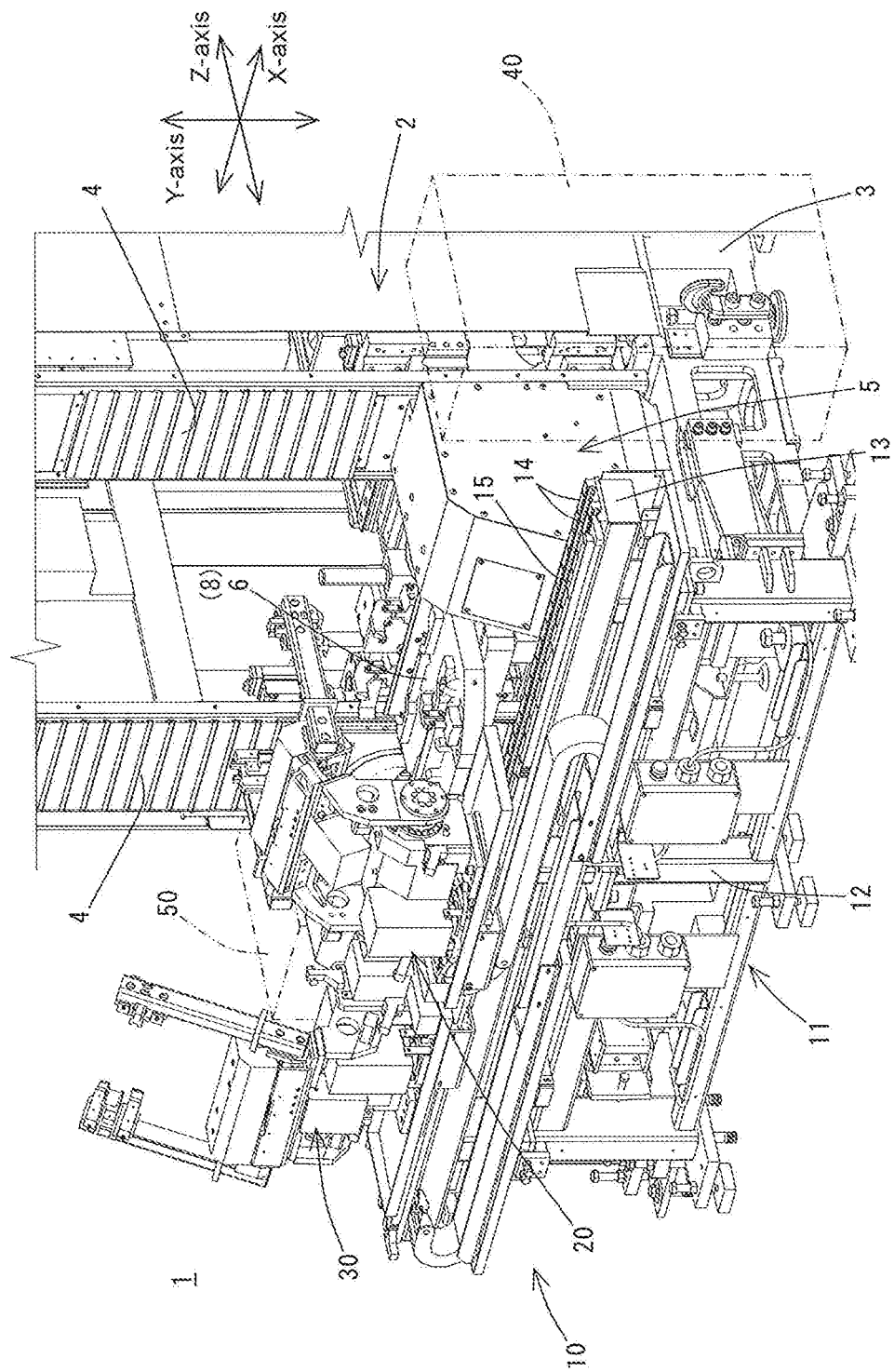
FIG. 1 is a perspective view showing a machine system according to an embodiment of the present invention, wherein a workpiece attachment/removal device is attached to a machine tool.
Figure 2:
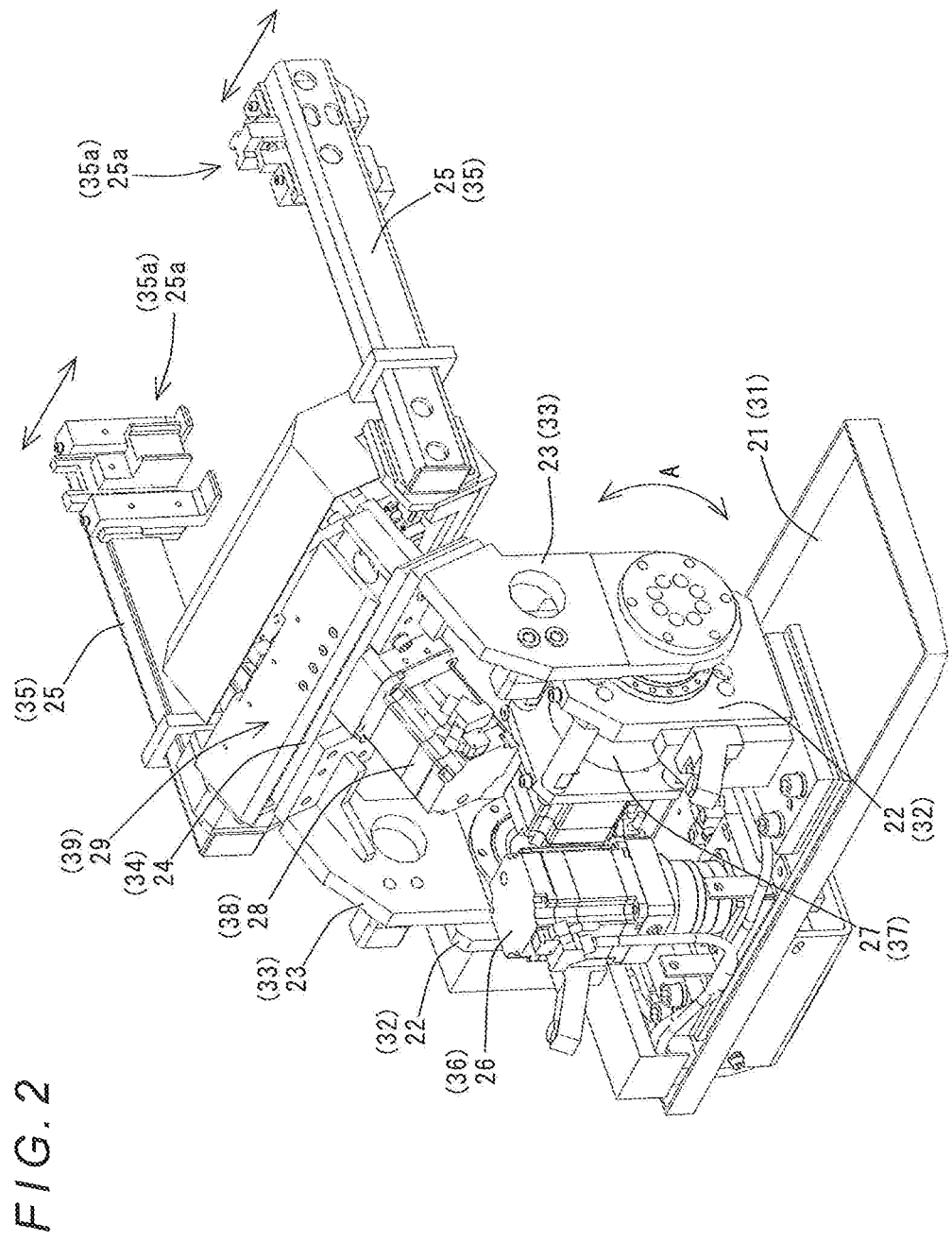
FIG. 2 is a perspective view showing a transfer mechanism in the embodiment.

Hereinafter, a specific embodiment of the present invention will be described with reference to the drawings. FIG. 1 is a perspective view showing a machining system according to an embodiment of the present invention, wherein a workpiece attachment/removal device is attached to a machine tool. FIG. 2 is a perspective view showing a transfer mechanism in the embodiment.

As shown in FIG. 1, the machining system 1 according to this embodiment is composed of the horizontal type machine tool 2 and the workpiece attachment/removal device 10 disposed before the machine tool 2. Below is described each component.

[Machine Tool]

First of all, the machine tool 2 is described schematically. As shown in FIG. 1, the machine tool 2 is composed of a bed 3, a saddle (not shown) provided on the bed 3 to be movable along a horizontal X-axis, a spindle head (not shown) provided on the saddle (not shown) to be movable along a horizontal Z-axis that is orthogonal to the X-axis, a spindle (not shown) supported by the spindle head (not shown) to be rotatable about an axis parallel to the Z-axis and holding a tool at a front end thereof, a pair of right and left columns 4, 4 erected on the bed 3 before the saddle (not shown) and spaced apart in the X-axis direction, a table support mechanism 5 provided on front surfaces of the pair of columns 4, 4 to be movable along a vertical Y-axis that is orthogonal to both the X-axis and the Z-axis, and a table 6 supported by the table support mechanism 5.

The table support mechanism 5 is U-shaped in front view, and supports the table 6 at a bottom portion thereof and is supported by the front surfaces of the columns 4, 4 at side portions thereof to move along the Y-axis. Further, the table support mechanism 5 is configured to be able to cause the supported table 6 to pivot about an axis extending along the X-axis (this movement axis is referred to as "B-axis").

The table 6 includes a base 7 and a workpiece receiver 8 having a placement surface for placing a workpiece thereon (see FIG. 3(a)), and the table 6 is configured to be able to rotate the workpiece receiver 8 about an axis orthogonal to the placement surface (this movement axis is referred to as "C-axis") and configured to be able to lift and lower the workpiece receiver 8 along the Y-axis by means of an appropriate actuator, such as a hydraulic cylinder.

Accordingly, in this machine tool 2, a workpiece is machined by relatively moving the table 6 and the spindle (not shown) in the three orthogonal axis directions, i.e., the X-axis, Y-axis, and Z-axis directions, and moving the table 6 in the B-axis and C-axis directions in a state where the workpiece is placed and fixed on the workpiece receiver 8 of the table 6 and the spindle (not shown) holds a tool and is rotated about the axis. Note that this machine tool 2 is a so-called "5-axis machine tool".

[Workpiece Attachment/Removal Device]

Next, the configuration of the workpiece attachment/removal device 10 is described. As shown in FIG. 1, the workpiece attachment/removal device 10 according to this embodiment includes a guide mechanism 11 disposed along the X-axis before the table support mechanism 5 and the table 6, a first placement table 40 and a second placement table 50 which are respectively disposed at right and left sides of the table support mechanism 5 behind the guide mechanism 11, and a first transfer mechanism 20 and a second transfer mechanism 30 which move along the X-axis while being guided by the guide mechanism 11.

The guide mechanism 11 is composed of a guide base 13 disposed along the X-axis, a support frame 12 supporting the guide base 13, and a pair of guide rails 14, 14 disposed in parallel along the X-axis on the guide base 13.

The first transfer mechanism 20 and the second transfer mechanism 30 are disposed in line along and on the guide mechanism 11. Note that the first transfer mechanism 20 and the second transfer mechanism 30 have an identical configuration; therefore, the configuration is described representatively with respect to the first transfer mechanism 20 based on FIGS. 1 and 2 and the identical components in the second transfer mechanism 30 are indicated by reference numerals in parentheses.

The first transfer mechanism 20 (30) includes a base 21 (31), a pair of brackets 22, 22 (32, 32) erected on the base 21 (31), turning arms 23, 23 (33, 33), and clamping arms 25, 25 (35, 35).

The base 21 (31) has a slider (not shown) fixed on a bottom surface thereof which is engaged with the guide rails 14, 14; the base 21 (31) is provided to be freely movable along the X-axis. The turning arms 23, 23 (33, 33) are supported on the brackets 22, 22 (32, 32) to be freely turnable in the arrow A direction, and the turning arms 23, 23 (33, 33) are coupled to each other by a coupling plate 24 (34) at tip ends thereof. Further, the coupling plate 24 (34) has an opening and closing mechanism 29 (39) disposed thereon, and the clamping arms 25, 25 (35, 35) are respectively coupled to side portions of the opening and closing mechanism 29 (39).

The base 21 (31) has a servo motor 26 (36) disposed on the top surface thereof. An output shaft of the servo motor 26 (36) penetrates the base 21 (31) and protrudes from the bottom surface of the base 21 (31), and has a pinion gear (not shown) attached to a tip end thereof. The pinion gear (not shown) meshes with a rack 15 that is disposed along the guide rails 14, 14 on the guide base 13.

One of the turning arms 23, 23 (33, 33) is coupled to an output shaft of a servo motor 27 (37). When the turning arms 23, 23 (33, 33) are driven by the servo motor 27 (37), a structure composed of the turning arms 23, 23 (33, 33) and the coupling plate 24 (34) is turned in the arrow A direction.

Further, the opening and closing mechanism 29 (39) is composed of a combination of a pair of racks and a pinon gear that is disposed between the racks; the pair of racks having the clamping arms 25, 25 (35, 35) respectively fixed to end portions thereof. Further, the pinion gear is coupled to an output shaft of a servo motor 28 (38) that is fixed to the lower surface of the coupling plate 24 (34). When the pinion gear is driven by the servo motor 28 (38), the clamping arms 25, 25 (35, 35) are opened or closed.

Thus, in this first transfer mechanism 20 (30), when the servo motor 26 (36) is driven, the base 21 (31) is guided by the guide rails 14, 14 because of the meshing between the pinion gear (not shown) attached to the output shaft of the servo motor 26 (36) and the rack 15, whereby the first transfer mechanism 20 (30) as a whole is moved along the X-axis.

Further, when the servo motor 27 (37) is driven, the turning arms 23, 23 (33, 33) and the clamping arms 25, 25 (35, 35) coupled to the turning arms 23, 23 (33, 33) are turned in the arrow A direction, whereby tip ends (clamping portions) 25a (35a) of the clamping arms 25, 25 (35, 35) are positioned at an upper position, which is set at a higher level, or at a lower position, which is set at a lower level. Further, when the opening and closing mechanism 29 (39) is driven by the servo motor 28 (38), the clamping arms 25, 25 (35, 35) are opened or closed. Note that the first transfer mechanism 20 (30) is disposed such that the clamping portions 25a (35a) of the clamping arms 25, 25 (35, 35) are directed toward the machine tool 2.

As described above, in the first transfer mechanism 20 (30), the servo motor 26 (36), the pinion gear (not shown), and the rack 15 constitute a linear drive part, while the servo motor 27 (37) constitutes a turning drive part. Further, the servo motor 28 (38) and the opening and closing mechanism 29 constitute a clamping drive part.

Figure 3:
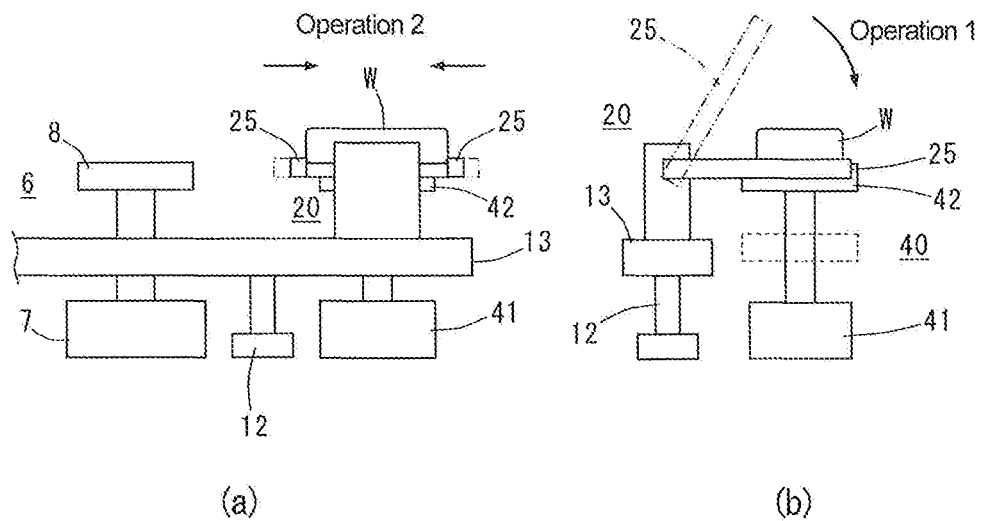
FIG. 3 is an illustration for explaining operation of the transfer mechanism in the embodiment.
Figure 4:
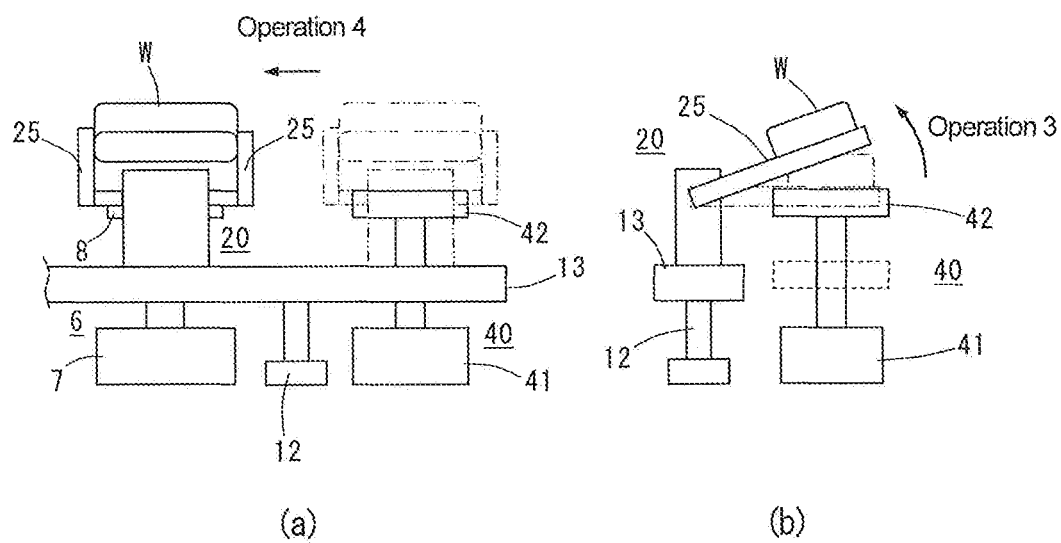
FIG. 4 is an illustration for explaining the operation of the transfer mechanism in the embodiment.
Figure 9:
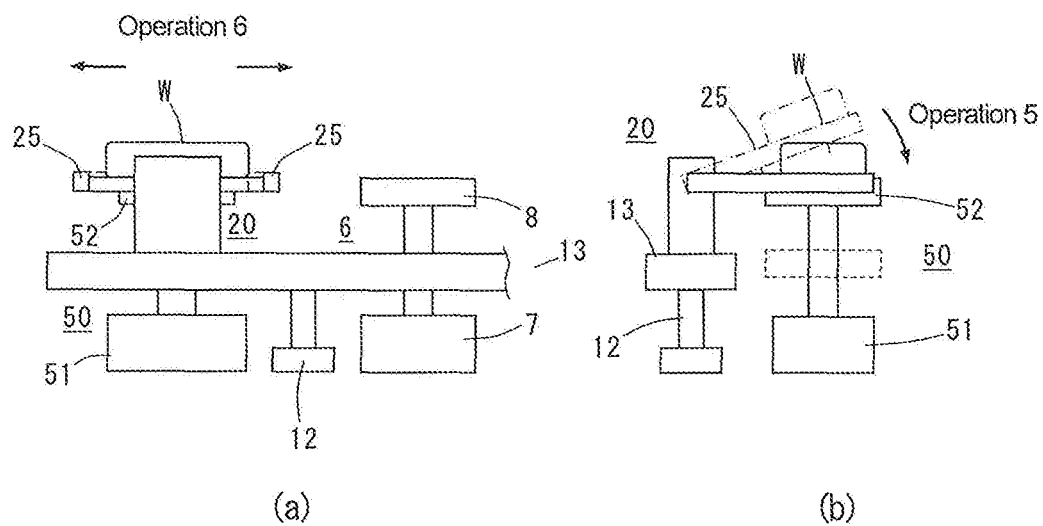
FIG. 9 is an illustration for explaining the operation of the transfer mechanism in the embodiment.
Figure 10:
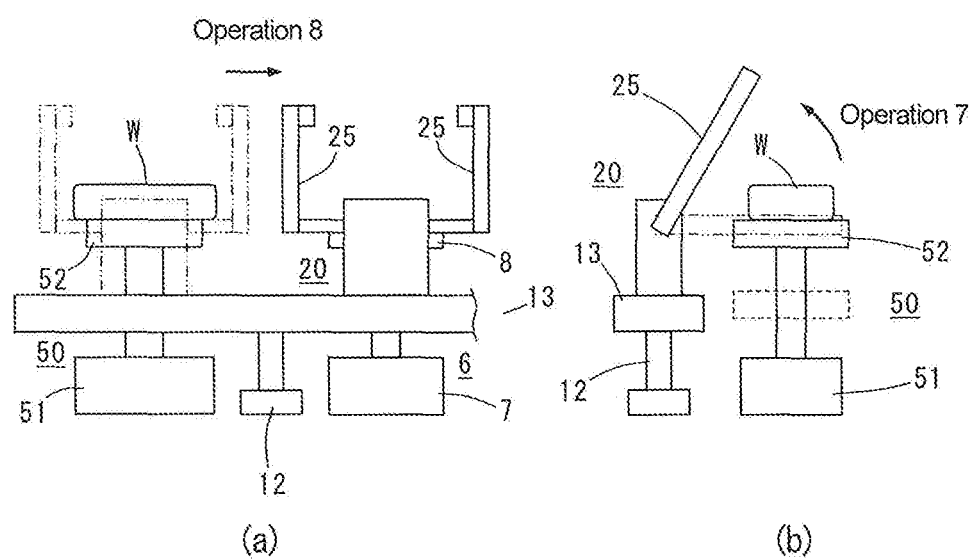
FIG. 10 is an illustration for explaining the operation of the transfer mechanism in the embodiment.

The first placement table 40 and the second placement table 50 have a similar configuration. As shown in FIGS. 3 and 9, the first placement table 40 and the second placement table 50 respectively include a base 41, 51 and a workpiece receiver 42, 52 for placing a workpiece W thereon, the workpiece receiver 42, 52 being configured to be lifted and lowered by an appropriate actuator, such as a hydraulic cylinder.

Next, a workpiece attachment/removal operation in the machining system 1 having the above-described configuration is described. Note that the first transfer mechanism 20 reciprocates along the X-axis between a position in front of the first placement table 40 and a position in front of the table 6, while the second transfer mechanism 30 reciprocates along the X-axis between a position in front of the table 6 and a position in front of the second placement table 50. Further, the workpiece receiver 8 of the table 6 has a machined workpiece W placed thereon, the workpiece receiver 42 of the first placement table 40 has an unmachined workpiece W placed thereon as appropriate, and the workpiece receiver 52 of the second placement table 50 has no workpiece W placed thereon.

OPERATION EXAMPLE I

First, an operation example I is described in accordance with FIGS. 3 to 10. FIGS. 3 to 6 show operations of the first transfer mechanism 20 and FIGS. 7 to 10 show operations of the second transfer mechanism 30, the first transfer mechanism 20 and the second transfer mechanism 30 operating concurrently. Further, in the default state, the first transfer mechanism 20 is positioned at the position in front of the first placement table 40, the second transfer mechanism 30 is positioned at the position in front of the table 6, and the clamping arms 25, 25 and 35, 35 are positioned at the upper position and in the opened state. Further, the workpiece receiver 42 of the first placement table 40, the workpiece receiver 52 of the second placement table 50, and the workpiece receiver 8 of the table 6 are positioned at their respective lifted positions and the top surfaces thereof are at an identical height. Note that, in each of FIGS. 3 to 10, (a) shows a font view and (b) shows a side view.

As shown in FIG. 3, the first transfer mechanism 20 first turns the clamping arms 25, 25 downward to position them at the lower position (operation 1 in FIG. 3 (b)), and then closes the clamping arms 25, 25 (operation 2 in FIG. 3(a)). Note that the lower position is a position at which the clamping arms 25, 25 are able to clamp a workpiece W placed on the workpiece receiver 42 and they are almost horizontal. Through the above operations, the workpiece W placed on the workpiece receiver 42 is clamped by the clamping arms 25, 25.

Subsequently, the first transfer mechanism 20 turns the clamping arms 25, 25 upward to position them at an intermediate position that is located below the upper position (operation 3 in FIG. 4(b)), and then moves along the X-axis to the position in front of the table 6 (operation 4 in FIG. 4(a)). Note that the intermediate position is a height position at which the clamping arms 25, 25 do not interfere with the workpiece receiver 42 of the first placement table 40 and the workpiece receiver 8 of the table 6 during movement of the first transfer mechanism 20 along the X-axis. Further, when the operation 4 in FIG. 4(a) is executed, the second transfer mechanism 30 has clamped the workpiece W placed on the workpiece receiver 8 of the table 6 and is moving toward the position in front of the second placement table 50 through operations described later.

Figure 5:
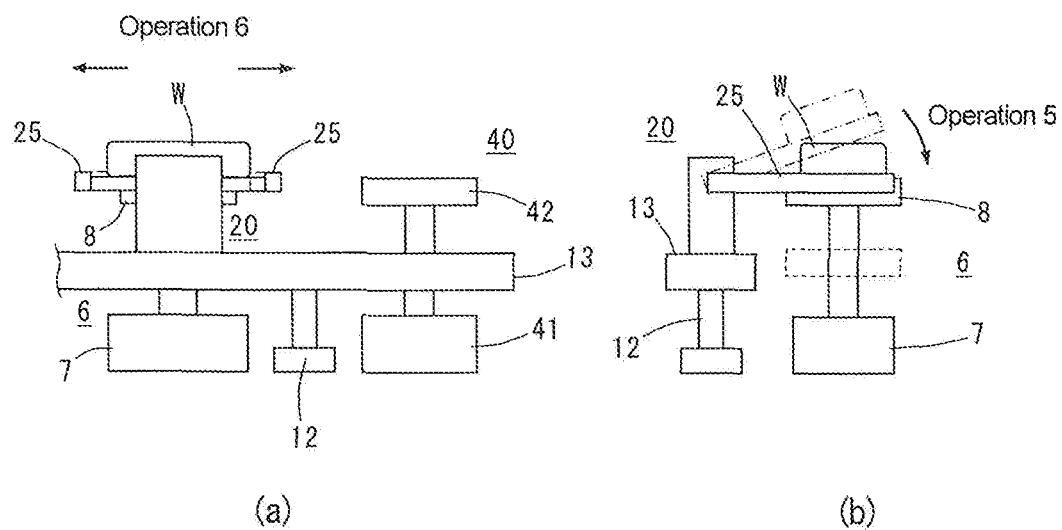
FIG. 5 is an illustration for explaining the operation of the transfer mechanism in the embodiment.
Figure 6:
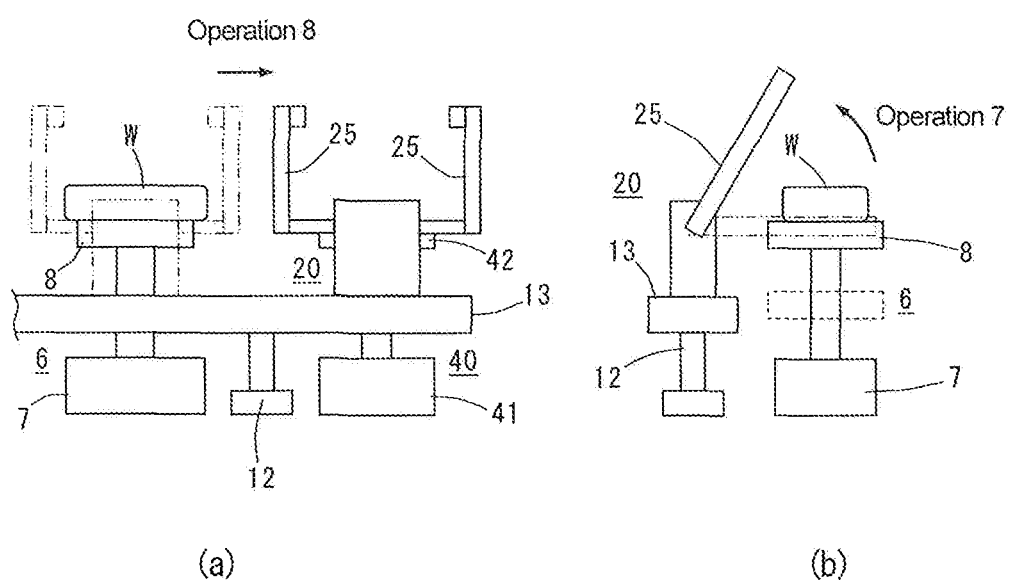
FIG. 6 is an illustration for explaining the operation of the transfer mechanism in the embodiment.

Subsequently, the first transfer mechanism 20 turns the clamping arms 25, 25 downward to position them at the lower position (operation 5 in FIG. 5 (b)), and then opens the clamping arms 25, 25 (operation 6 in FIG. 5(a)). Thereby, the unmachined workpiece W is placed on the workpiece receiver 8 of the table 6. Thereafter, the first transfer mechanism 20 turns the clamping arms 25, 25 upward to position them at the upper position (operation 7 in FIG. 6(b)), and then moves along the X-axis to the position in front of the first placement table 40, thereby returning to the default state (operation 8 in FIG. 6(a)).

Figure 7:
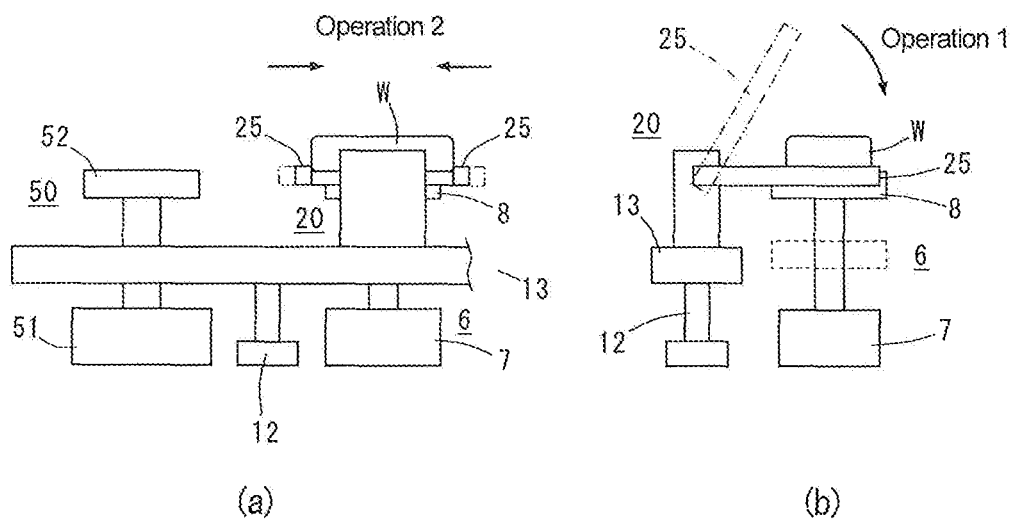
FIG. 7 is an illustration for explaining the operation of the transfer mechanism in the embodiment.
Figure 8:
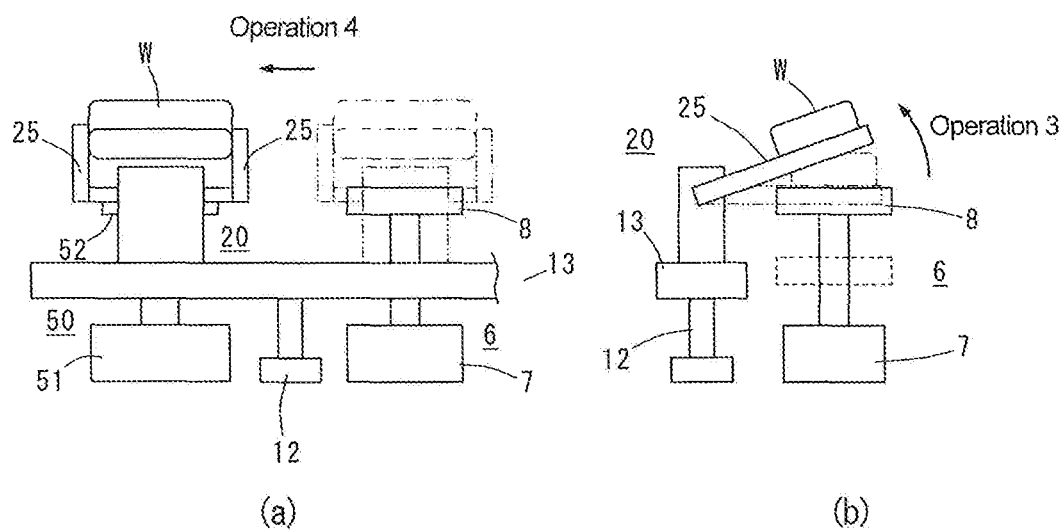
FIG. 8 is an illustration for explaining the operation of the transfer mechanism in the embodiment.

On the other hand, as shown in FIG. 7, the second transfer mechanism 30 first turns the clamping arms 35, 35 downward to position them at the lower position (operation 1 in FIG. 7(b)), and then closes the clamping arms 35, 35 (operation 2 in FIG. 7(a)). Note that the lower position is a position at which the clamping arms 35, 35 are able to clamp a workpiece W placed on the workpiece receiver 8 of the table 6 and they are almost horizontal. Through the above operations, the workpiece W placed on the workpiece receiver 8 is clamped by the clamping arms 35, 35.

Subsequently, the second transfer mechanism 30 turns the clamping arms 35, 35 upward to position them at an intermediate position located below the upper position, and removes the machined workpiece W from the workpiece receiver 8 (operation 3 in FIG. 8(b)). Thereafter, the second transfer mechanism 30 moves along the X-axis to the position in front of the second placement table 50 (operation 4 in FIG. 8(a)). Note that the intermediate position is a height position at which the clamping arms 35, 35 do not interfere with the workpiece receiver 8 of the table 6 and the workpiece receiver 52 of the second placement table 50 during movement of the second transfer mechanism 30 along the X-axis.

Subsequently, the second transfer mechanism 30 turns the clamping arms 35, 35 downward to position them at the lower position (operation 5 in FIG. 9(b)), and then opens the clamping arms 35, 35 (operation 6 in FIG. 9(a)). Thereby, the machined workpiece W is placed on the workpiece receiver 52 of the second placement table 50. Thereafter, the second transfer mechanism 30 turns the clamping arms 35, 35 upward to position them at the upper position (operation 7 shown in FIG. 10(b)), and then moves along the X-axis to the position in front of the table 6, thereby returning to the default state (operation 8 in FIG. 10(a)).

Through the above-described concurrent operations of the first transfer mechanism 20 and the second transfer mechanism 30, a machined workpiece W placed on the workpiece receiver 8 (table 6) is removed and an unmachined workpiece W is loaded onto the workpiece receiver 8.

In this operation example I, lifting and lowering of the workpiece receiver 8, the workpiece receiver 42, and the workpiece receiver 52, which require relatively much time, are not performed; therefore, attachment and removal of a workpiece W to and from the workpiece receiver 8 can be performed in a short time in comparison with an operation example II that is described later.

Note that, in the above-described case in which the workpiece receiver 8, the workpiece receiver 42, and the workpiece receiver 52 are not lifted and lowered, as a matter of course, the table 6, the first placement table 40, and the second placement table 50 do not particularly have to include the actuators and such a configuration can reduce the costs for manufacturing them.

In such a case, the heights of the workpiece receiver 8, the workpiece receiver 42, and the workpiece receiver 52 do not have to be at their respective upper positions, so long as they are at a height at which they are equal to the lower position at which the clamping arms 25, 25 and 35, 35 are almost horizontal. For example, the heights of the workpiece receiver 8, the workpiece receiver 42, and the workpiece receiver 52 may be at their respective lowered positions, which are described later. In such a case, however, the intermediate positions of the clamping arms 25, 25 and 35, 35 are each a height position at which they do not interfere with the table support mechanism 5 that is U-shaped in front view.

However, if any one of the workpiece receiver 8, the workpiece receiver 42, and the workpiece receiver 52 needs to be lifted and lowered, for example, in the operation 1 of the first transfer mechanism 20 shown in FIG. 3(b), an operation of lifting the workpiece receiver 42 from the position indicated by the broken line may be executed simultaneously with the operation 1, and in the operation 3 shown in FIG. 4(b), an operation of lowering the workpiece receiver 42 to the position indicated by the broken line may be executed simultaneously with the operation 3.

Further, in the operation 5 shown in FIG. 5(b), an operation of lifting the workpiece receiver 8 from the position indicated by the broken line may be executed prior to the operation 5, and in the operation 7 shown in FIG. 6(b), an operation of lowering the workpiece receiver 8 to the position indicated by the broken line may be executed simultaneously with the operation 7.

Further, in the operation 1 of the second transfer mechanism 30 shown in FIG. 7(b), an operation of lifting the workpiece receiver 8 from the position indicated by the broken line may be executed simultaneously with the operation 1, and in the operation 3 shown in FIG. 8(b), an operation of lowering the workpiece receiver 8 to the position indicated by the broken line may be executed simultaneously with the operation 3.

Further, in the operation 5 shown in FIG. 9(b), an operation of lifting the workpiece receiver 52 from the position indicated by the broken line may be executed prior to the operation 5, and in the operation 7 shown in FIG. 10(b), an operation of lowering the workpiece receiver 52 to the position indicated by the broken line may be executed simultaneously with the operation 7.

OPERATION EXAMPLE II

Next, an operation example II is described in accordance with FIGS. 11 to 18. FIGS. 11 to 14 show operations of the first transfer mechanism 20 and FIGS. 15 to 18 show operations of the second transfer mechanism 30, the first transfer mechanism 20 and the second transfer mechanism 30 operating concurrently. Further, in the default state, the first transfer mechanism 20 is positioned at the position in front of the first placement table 40, the second transfer mechanism 30 is positioned at the position in front of the table 6, and the clamping arms 25, 25 and 35, 35 are positioned at the upper position and in the closed state. Further, the workpiece receiver 42 of the first placement table 40, the workpiece receiver 52 of the second placement table 50, and the workpiece receiver 8 of the table 6 are positioned at their respective lowered positions, and the top surfaces thereof are at an identical height when they are lifted to their respective lifted positions. Note that, in each of FIGS. 11 to 18, (a) shows a front view and (b) shows a side view.

Figure 11:
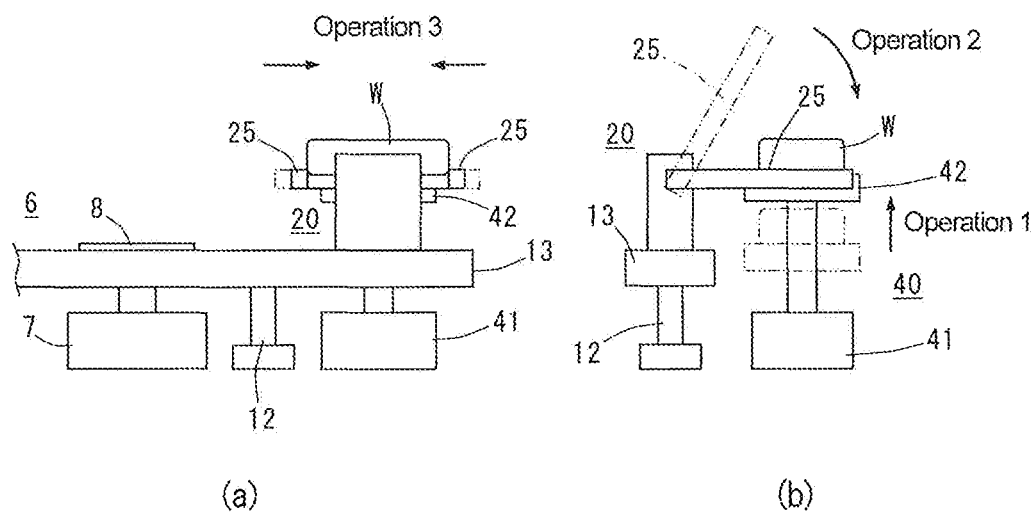
FIG. 11 is an illustration for explaining the operation of the transfer mechanism in the embodiment.
Figure 12:
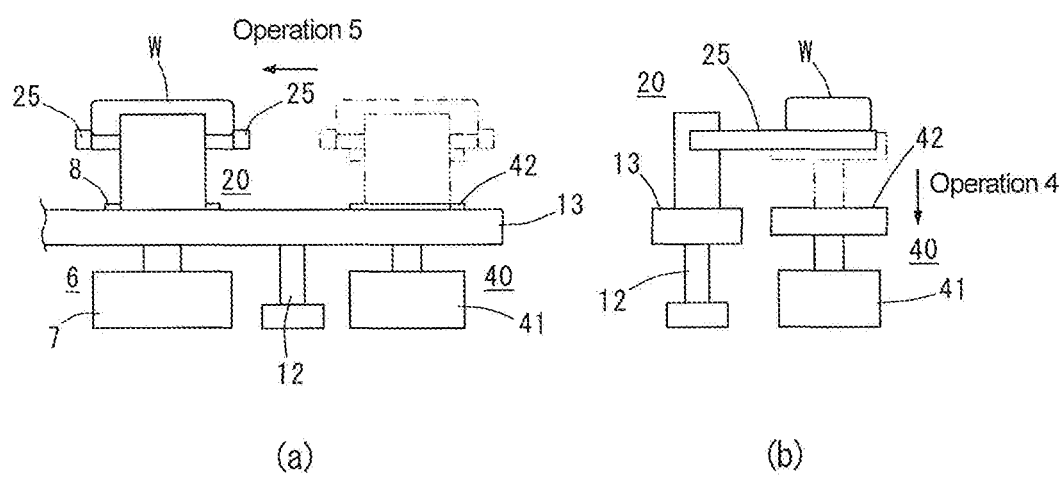
FIG. 12 is an illustration for explaining the operation of the transfer mechanism in the embodiment.
Figure 13:
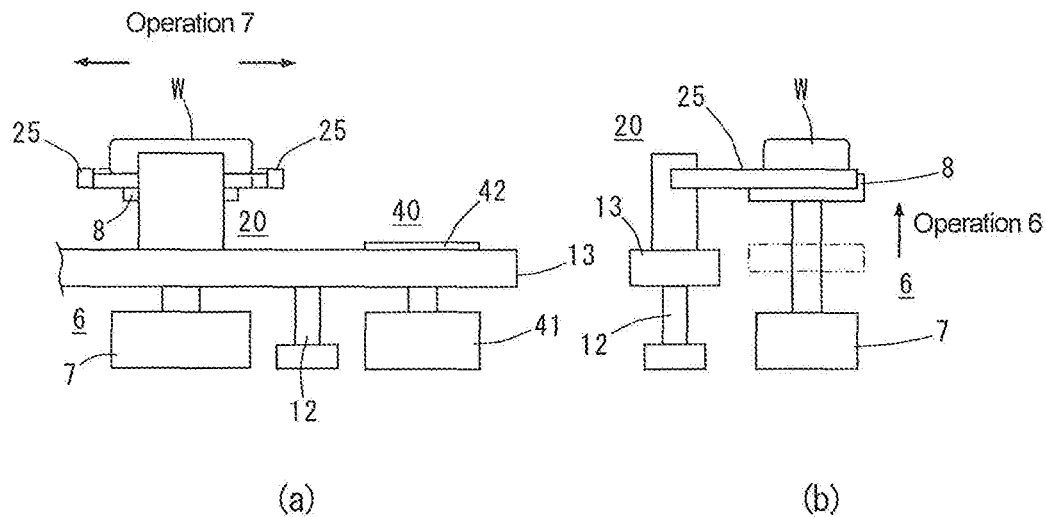
FIG. 13 is an illustration for explaining the operation of the transfer mechanism in the embodiment.
Figure 14:
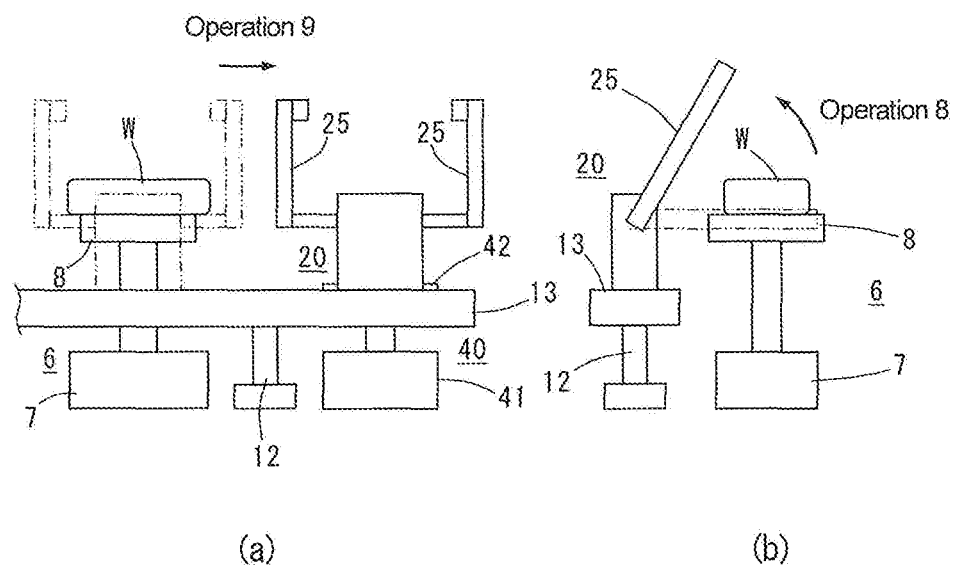
FIG. 14 is an illustration for explaining the operation of the transfer mechanism in the embodiment.

As shown in FIG. 11, the first transfer mechanism 20 first moves the workpiece receiver 42 of the first placement table 40 to its lifted position (operation 1 in FIG. 11(b)), and then turns the clamping arms 25, 25 downward to position them at the lower position (operation 2 in FIG. 11(b)), after which the first transfer mechanism 20 closes the clamping arms 25, 25 (operation 3 in FIG. 11(a)). Note that the lower position of the clamping arms 25, 25 is a position at which the clamping arms 25, 25 are able to clamp a workpiece W placed on the workpiece receiver 42 that is positioned at its lifted position and they are almost horizontal. Through the above operations, the workpiece W placed on the workpiece receiver 42 is clamped by the clamping arms 25, 25.

Subsequently, the workpiece receiver 42 of the first placement table 40 is moved to its lowered position (operation 4 in FIG. 12(b)), and then the first transfer mechanism 20 is moved along the X-axis and positioned at the position in front of the table 6 (operation 5 in FIG. 12(a)). Note that, when the first transfer mechanism 20 executes the operation 5 shown in FIG. 12(a), the second transfer mechanism 30 has clamped the workpiece W placed on the workpiece receiver 8 of the table 6 and is moving toward the position in front of the second placement table 50 through operations described later.

Subsequently, the workpiece receiver 8 of the table 6 is lifted to its lifted position (operation 6 in FIG. 13(b)), and then the clamping arms 25, 25 of the first transfer mechanism 20 are opened (operation 7 in FIG. 13(a)). Thereby, the unmachined workpiece W is placed on the workpiece receiver 8 of the table 6. Thereafter, the clamping arms 25, 25 of the first transfer mechanism 20 are turned upward and positioned at the upper position (operation 8 in FIG. 14(b)), and then the first transfer mechanism 20 is moved along the X-axis and positioned at the position in front of the first placement table 40, thereby being returned to the default state (operation 9 in FIG. 14(a)).

Figure 15:
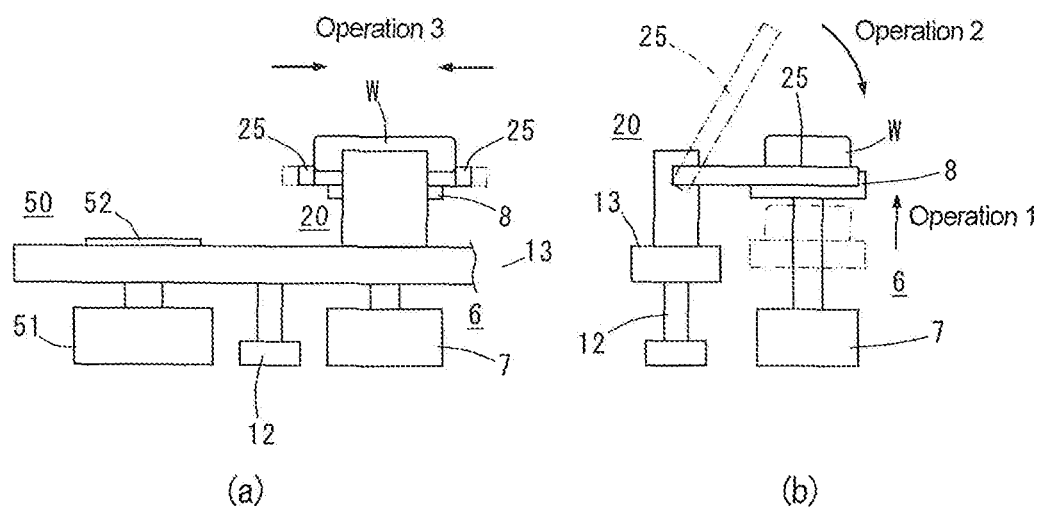
FIG. 15 is an illustration for explaining the operation of the transfer mechanism in the embodiment.

On the other hand, as shown in FIG. 15, the second transfer mechanism 30 first moves the workpiece receiver 8 of the table 6 to its lifted position (operation 1 in FIG. 15(b)), and then turns the clamping arms 35, 35 downward to position them at the lower position (operation 2 in FIG. 15(b), after which the second transfer mechanism 30 closes the clamping arms 35, 35 (operation 3 in FIG. 15(*a*)). Note that the lower position is a position at which the clamping arms 35, 35 are able to clamp a workpiece W placed on the workpiece receiver 8 of the table 6 and they are almost horizontal. Through the above operations, the workpiece W placed on the workpiece receiver 8 is clamped by the clamping arms 35, 35.

Figure 16:
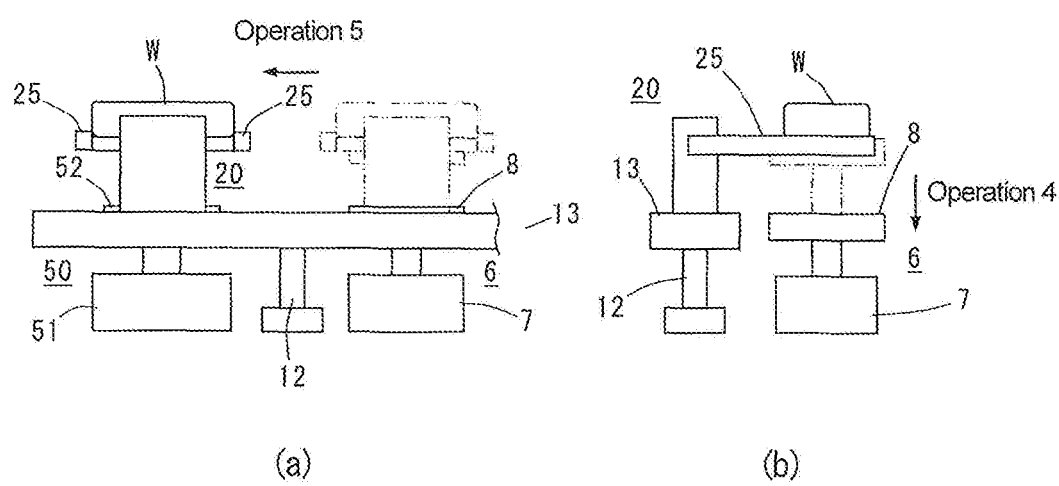
FIG. 16 is an illustration for explaining the operation of the transfer mechanism in the embodiment.

Subsequently, the workpiece receiver 8 of the table 6 is moved to its lowered position (operation 4 in FIG. 16(*b*)), and then the second transfer mechanism 30 is moved along the X-axis and positioned at the position in front of the second placement table 50 (operation 5 in FIG. 16(*a*)).

Figure 17:
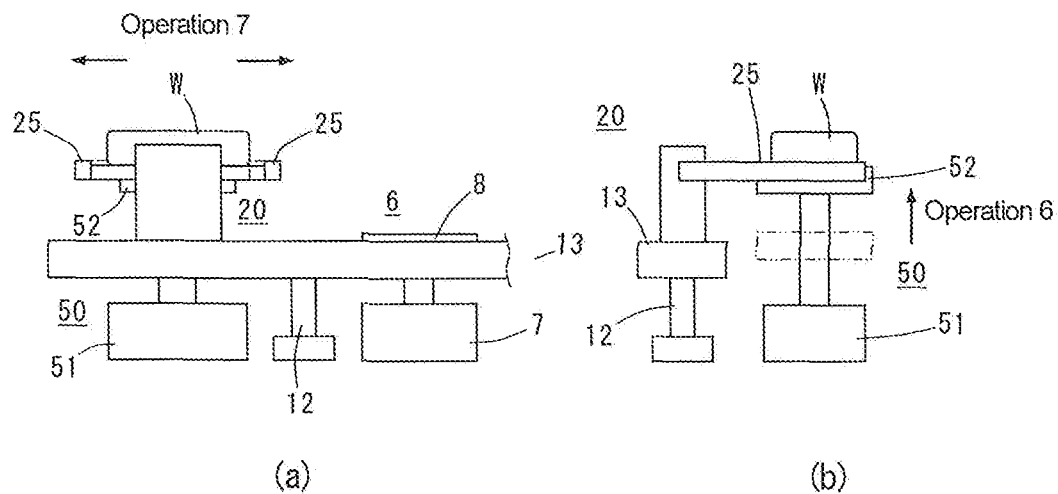
FIG. 17 is an illustration for explaining the operation of the transfer mechanism in the embodiment.
Figure 18:
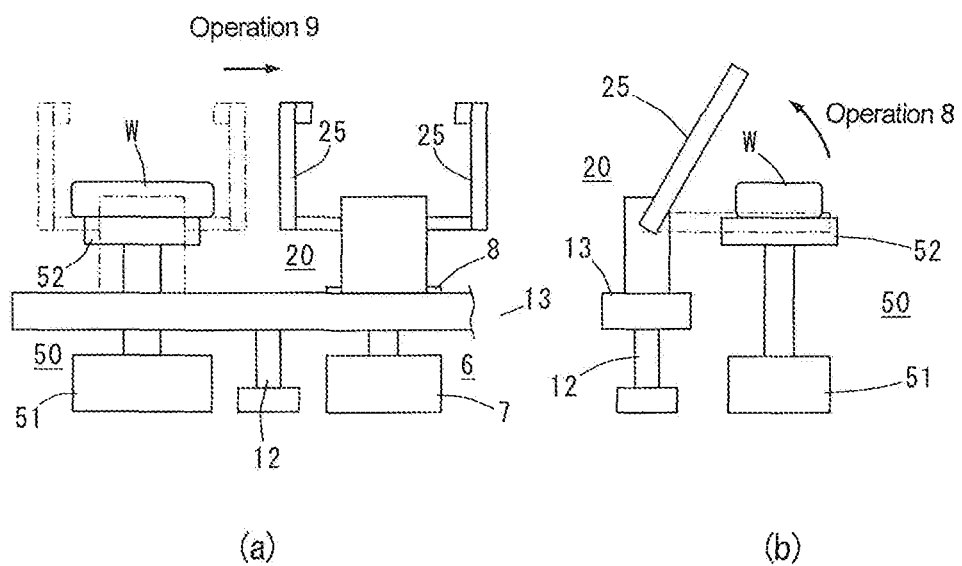
FIG. 18 is an illustration for explaining the operation of the transfer mechanism in the embodiment.

Subsequently, the workpiece receiver 52 of the second placement table 50 is lifted to its lifted position (operation 6 in FIG. 17(*b*)), and then the clamping arms 35, 35 of the second transfer mechanism 30 are opened (operation 7 in FIG. 17(*a*)). Thereby, the machined workpiece W is placed on the workpiece receiver 52 of the second placement table 50. Thereafter, the clamping arms 35, 35 of the second transfer mechanism 30 are turned upward and positioned at the upper position (operation 8 in FIG. 18(*b*)), and then the second transfer mechanism 30 is moved along the X-axis and positioned at the position in front of the table 6, thereby being returned to the default state (operation 9 in FIG. 18(*a*)).

Through the above-described concurrent operations of the first transfer mechanism 20 and the second transfer mechanism 30, a machined workpiece W placed on the workpiece receiver 8 (table 6) is removed and an unmachined workpiece W is loaded onto the workpiece receiver 8.

As described in detail above, with the machining system 1 according to this embodiment, since the workpiece attachment/removal device 10 is provided outside and adjacent to the machine tool 2, unlike the conventional art, it is not necessary to excessively increase the size of the machine tool itself and a large space is not needed for installation of the machining system 1. Further, since the first transfer mechanism 20 and the second transfer mechanism 30 are configured to directly clamp a workpiece W for transfer, the size of the workpiece attachment/removal device 10 itself can be made compact in comparison with the conventional art in which a workpiece is transferred in a state of being attached to a workpiece carrier. Also in this respect, unlike the conventional art, a large space is not needed.

Further, the machine tool 2 can employ an optimum configuration without being influenced by the configuration of the workpiece attachment/removal device 10. Therefore, unlike the conventional art, the machine tool 2 can machine a workpiece W in an optimum time without being influenced by the workpiece attachment/removal device 10.

Hereinbefore, one embodiment of the present invention has been described. However, the present invention is not limited thereto and can be implemented in other modes.

For example, although in the above embodiment two transfer mechanisms, i.e., the first transfer mechanism 20 and the second transfer mechanism 30, are provided, the present invention is not limited thereto and a configuration is possible in which one transfer mechanism is provided. In this case, the transfer mechanism first executes the operations for unloading a machined workpiece W from the table 6 (FIGS. 7 to 10, FIGS. 15 to 18), and then executes the operations for loading an unmachined workpiece W onto the table 6 (FIGS. 3 to 6, FIGS. 11 to 14).

Further, although in the above embodiment the first transfer mechanism 20 and the second transfer mechanism 30 are engaged with the same guide rails 14, 14, the present invention is not limited thereto. The first transfer mechanism 20 and the second transfer mechanism 30 may be engaged with separate guide rails. Similarly, although the first transfer mechanism 20 and the second transfer mechanism 30 use the same track 15 for movement along the X-axis, the first transfer mechanism 20 and the second transfer mechanism 30 may use separate racks.

Furthermore, although the above embodiment exemplifies a single machining system 1, the present invention is not limited thereto and a configuration is possible in which a plurality of machining systems are coupled in line. In this case, the first placement table and the second placement table are shared by the machining systems adjacent in the transfer direction; the second placement table of the machining system positioned upstream functions as the first placement table of the machining system positioned downstream. Further, in this case, examples of the machine tool may include machine tools of other types than the horizontal type machine tool used in the above embodiment, i.e., examples of the machine tool may include vertical type machine tools and special-purpose machines besides general-purpose machines.

REFERENCE SIGNS LIST

1 Machining system
2 Machine tool
3 Bed
4 Column
5 Table support mechanism
6 Table
8 Workpiece receiver
10 Workpiece attachment/removal device
11 Guide mechanism
20 First transfer mechanism
21 Base
23 Turning arm
25 Clamping arm
30 Second transfer mechanism
31 Base
33 Turning arm
35 Clamping arm
40 First placement table
42 Workpiece receiver
50 Second placement table
52 Workpiece receiver

The invention claimed is:

1. A workpiece attachment/removal device attached to a machine tool, the machine tool including a bed, a saddle provided on the bed, a spindle head provided on the saddle, a spindle rotatably supported by the spindle head and holding a tool at a front end thereof, a pair of right and left columns erected on the bed before the saddle and spaced apart in an X-axis direction which is a lateral direction of the bed, and a table supported on front surfaces of the pair of columns to be movable along a vertical Y-axis, the workpiece attachment/removal device unloading a workpiece placed on the table and loading a workpiece onto the table, the workpiece attachment/removal device comprising:
    a guide mechanism disposed along the X-axis before the table;
    a first placement table and a second placement table disposed at right and left sides of the table behind the guide mechanism; and
    a transfer mechanism moving along the X-axis while being guided by the guide mechanism, the transfer mechanism including:
- a base engaged with the guide mechanism and provided to be movable along the X-axis;
- a linear drive part moving the base along the X-axis direction;
- a pair of clamping arms provided perpendicularly to the X-axis to be openable and closable by separating from each other and approaching each other, the pair of clamping arms each having at a tip end thereof a clamping portion for clamping a workpiece and being disposed such that the clamping portions thereof are located at the table side;
- a clamping drive part opening and closing the pair of clamping arms; and
- a turning drive part supporting the pair of clamping arms on the base and turning the pair of clamping arms only in a plane perpendicular to the X-axis such that the clamping portions thereof pivot between a lower position and an upper position, the pair of clamping arms being configured to be moved along the X-axis direction by the linear drive part so as to pass above each of the table, the first placement table, and the second placement table, and being configured to carry out release of a clamped workpiece and clamping of a workpiece by opening and closing thereof when they have been turned so that the clamping portions thereof are positioned at the lower position, and the transfer mechanism being configured to execute an operation of clamping a workpiece placed on the table with the clamping arms and unloading the workpiece onto the second placement table, and an operation of clamping a workpiece placed on the first placement table with the clamping arms and loading the workpiece onto the table.

2. The workpiece attachment/removal device according to claim 1, wherein when the clamping arms are moved along the X-axis direction by the linear drive part, the tip ends of the clamping arms are in a state of being positioned at an intermediate position between the lower position and the upper position.

3. The workpiece attachment/removal device according to claim 1, wherein:
- the workpiece attachment/removal device includes two said transfer mechanisms: a first transfer mechanism and a second transfer mechanism;
- the second transfer mechanism is configured to execute an operation of clamping a workpiece placed on the table with the clamping arms of the second transfer mechanism and unloading the workpiece onto the second placement table; and
- the first transfer mechanism is configured to execute an operation of clamping a workpiece placed on the first placement table with the clamping arms of the first transfer mechanism and loading the workpiece onto the table.

4. The workpiece attachment/removal device according to claim 2, wherein:
- the workpiece attachment/removal device includes two said transfer mechanisms: a first transfer mechanism and a second transfer mechanism;
- the second transfer mechanism is configured to execute an operation of clamping a workpiece placed on the table with the clamping arms of the second transfer mechanism and unloading the workpiece onto the second placement table; and
- the first transfer mechanism is configured to execute an operation of clamping a workpiece placed on the first placement table with the clamping arms of the first transfer mechanism and loading the workpiece onto the table.

5. The workpiece attachment/removal device according to claim 1, wherein the first and second placement tables are each configured to be able to lift and lower a workpiece receiver for placing the workpiece thereon.

6. The workpiece attachment/removal device according to claim 2, wherein the first and second placement tables are each configured to be able to lift and lower a workpiece receiver for placing the workpiece thereon.

7. The workpiece attachment/removal device according to claim 3, wherein the first and second placement tables are each configured to be able to lift and lower a workpiece receiver for placing the workpiece thereon.

8. The workpiece attachment/removal device according to claim 4, wherein the first and second placement tables are each configured to be able to lift and lower a workpiece receiver for placing the workpiece thereon.

* * * * *